United States Patent
Naik et al.

(10) Patent No.: US 11,161,542 B2
(45) Date of Patent: Nov. 2, 2021

(54) METHODS AND APPARATUS TO REDUCE NOISE AND VIBRATION IN A HYBRID HYDRAULIC POWER STEERING SYSTEM

(71) Applicant: Ford Global Technologies, LLC, Dearborn, MI (US)

(72) Inventors: Anand Pradip Naik, Royal Oak, MI (US); Bradley G. Hochrein, Dexter, MI (US); Timothy Gerard Offerle, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 678 days.

(21) Appl. No.: 15/946,573

(22) Filed: Apr. 5, 2018

(65) Prior Publication Data
US 2019/0308661 A1 Oct. 10, 2019

(51) Int. Cl.
*B62D 5/065* (2006.01)
*B62D 5/04* (2006.01)

(52) U.S. Cl.
CPC ........... *B62D 5/065* (2013.01); *B62D 5/0463* (2013.01)

(58) Field of Classification Search
CPC .............................. B62D 5/065; B62D 5/0463
See application file for complete search history.

(56) References Cited

U.S. PATENT DOCUMENTS

| 5,719,766 | A | 2/1998 | Bolourchi et al. |
| 7,720,583 | B2 | 5/2010 | Takamatsu et al. |
| 9,254,862 | B2 | 2/2016 | Kezobo et al. |
| 2003/0230443 | A1* | 12/2003 | Cramer ............... B60G 3/20 180/65.51 |
| 2007/0168217 | A1* | 7/2007 | Weas ............... G06Q 30/0278 705/307 |
| 2014/0088835 | A1 | 3/2014 | Sworn et al. |
| 2015/0041239 | A1* | 2/2015 | Choi ................... B62D 5/065 180/422 |
| 2017/0174255 | A1 | 6/2017 | Kim |
| 2018/0370561 | A1* | 12/2018 | Tsubaki ............ B62D 5/0463 |

FOREIGN PATENT DOCUMENTS

JP 5235693 4/2013

* cited by examiner

*Primary Examiner* — Mathew Franklin Gordon
(74) *Attorney, Agent, or Firm* — Ray Coppiellie; Hanley, Flight & Zimmerman, LLC

(57) ABSTRACT

Methods and apparatus to reduce noise and vibration in a hybrid hydraulic power steering system are disclosed. A method includes receiving sensor data from sensors of a vehicle and mapping the sensor data to filter coefficients. The method further includes generating a torque demand based on an input of the filter coefficients into a polynomial filter and tuning at least one of a torque assistance or a steering damping of an assisted steering system of the vehicle based on the torque demand.

20 Claims, 6 Drawing Sheets

METHODS AND APPARATUS TO REDUCE NOISE AND VIBRATION IN A HYBRID HYDRAULIC POWER STEERING SYSTEM

FIELD OF THE DISCLOSURE

This disclosure relates generally to power steering and, more particularly, to methods and apparatus to reduce noise and vibration in a hybrid hydraulic power steering system.

BACKGROUND

Vehicle hydraulic power steering systems include a hydraulic power steering gear or gearbox operatively coupled to a rack and pinion steering assembly, a steering column, and a closed hydraulic system including a hydraulic fluid pump communicatively coupled to the hydraulic power steering gear and a hydraulic fluid reservoir. The steering column transmits inputs to the vehicle steering wheel to the rack and pinion assembly, which converts rotation of the steering wheel into a lateral motion of the rack to move the vehicle wheels. The hydraulic power steering gear includes a power cylinder and a rotary control valve to direct hydraulic fluid from the hydraulic fluid pump to a selected side of the rack piston, which converts hydraulic pressure into a linear force to move the rack in a desired direction (i.e. to the left or to the right). Hydraulic power steering systems also typically include spool valves that mechanically regulate the amount of hydraulic fluid that acts upon the steering system.

SUMMARY

A method disclosed herein includes receiving sensor data from sensors of a vehicle and mapping the sensor data to filter coefficients. The method also includes generating a torque demand based on an input of the filter coefficients into a polynomial filter and tuning at least one of a torque assistance or a steering damping of an assisted steering system of the vehicle based on the torque demand.

A tangible computer readable storage medium disclosed herein comprises instructions that, when executed, cause a machine to at least receive sensor data from sensors of a vehicle, map sensor data to filter coefficients, generate a torque demand based on an input of the filter coefficients into a polynomial filter and tune at least one of a torque assistance or a steering damping of an assisted steering system of the vehicle based on the torque demand.

A method disclosed herein includes receiving sensor data from sensors of a vehicle and damping a steering velocity of the vehicle based on the sensor data. The method also includes determining if the vehicle is undergoing an evasive maneuver and if the vehicle is undergoing an evasive maneuver, reducing the damping of the steering velocity.

Figure 1:
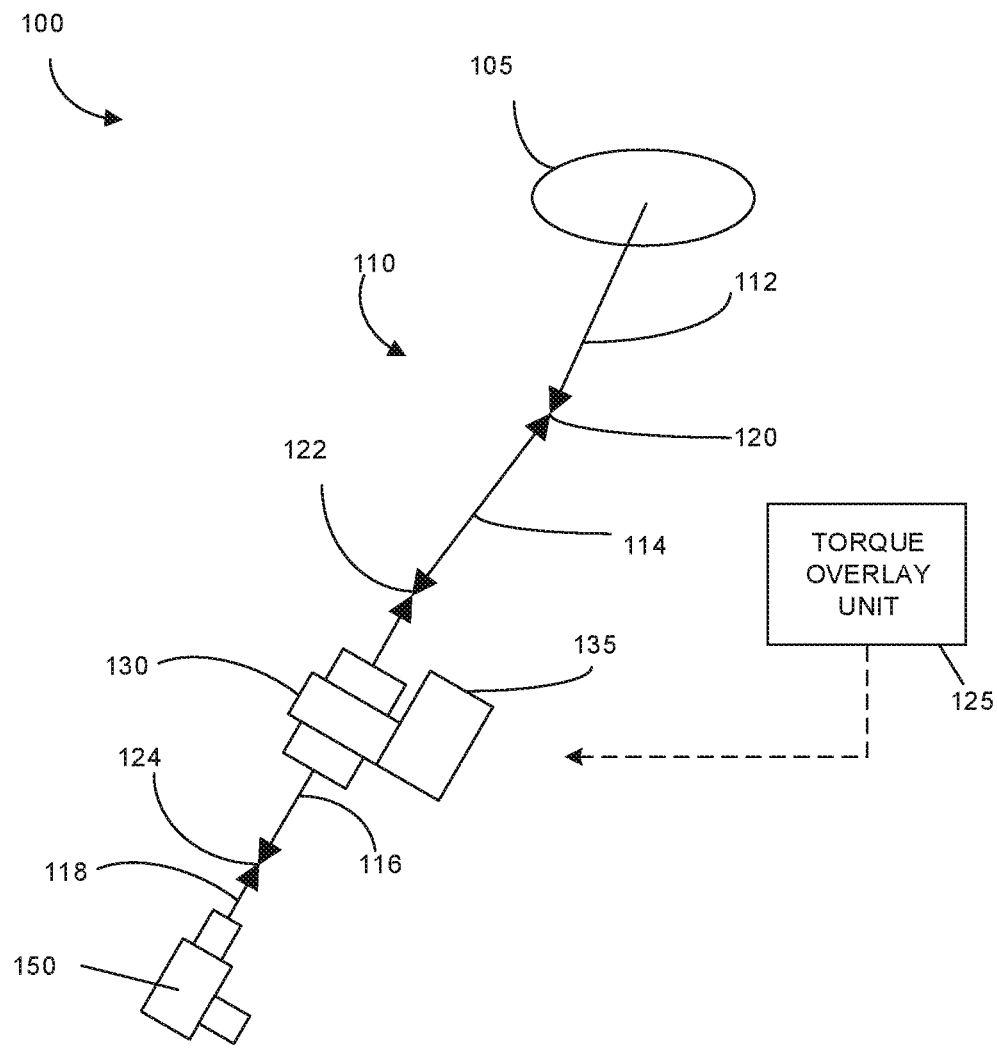
FIG. 1 is an illustration of an example steering system within which the teachings of this disclosure may be implemented.

The figures are not to scale. In general, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers). As used herein, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

DETAILED DESCRIPTION

Vehicle hydraulic power assisted steering (HPAS) systems reduce the amount of driver applied torque required to turn the wheels of a vehicle. HPAS systems provide higher levels of system pressure that act to assist the inputs of the driver to the steering system. HPAS systems sometimes exhibit instability as a result of undamped or improperly damped steering dynamics. These instabilities often lead to noise, vibration and harshness in the steering system which can cause an unpleasant experience for the driver and unneeded wear on the vehicle.

Traditionally, to reduce the likelihood of a driver encountering noise, vibration and instability, steering systems often feature specially shaped spool valve edges. Alternatively, specially designed hydraulic circuits may be used to modify the damping of the HPAS system. However, these solutions can compromise steering feel as well as increase cost and energy consumption of the HPAS system. Additionally, in some cases, adjusting the steering assistance in these manners can cause an excessive change in steering torque and a loss of driver authority. As used herein, driver authority is a metric used to describe the compliance of a vehicle to driver input. High driver authority means the vehicle is highly compliant and responsive to driver input. Lowering driver authority means a vehicle becomes less compliant to driver input and, in some cases, may make the driver feel less connected to the road.

Some HPAS systems utilize additional electromechanical devices to adjust the amount of torque applied to the steering column. As used herein, hybrid HPAS systems feature one or more electromechanical steering assistance elements that tune the amount of steering assistance supplied by the primary hydraulic based steering assistance system. As used herein, tuning the steering assistance refers to the process of controlling the amount of steering assistance applied by the electromechanical steering assistance elements. One type of hybrid HPAS system features an electric motor and drive mechanism coupled to the steering column that is herein referred to as a torque overlay unit. As used herein, the amount of steering assistance applied by the electromechanical steering elements is referred to as the electric steering assistance and the amount of steering assistance applied by the hydraulic elements is referred to as the primary steering assistance and/or hydraulic steering assistance.

In accordance with the present disclosure, methods and apparatus to reduce noise and vibration in a hybrid hydraulic power steering system are disclosed. Examples disclosed herein use an electronically controlled torque overlay unit installed on the steering column to implement methods to reduce noise, vibration and harshness in the steering system. Examples disclosed herein reduce and/or prevent damage and/or deterioration of steering system components due to overheating, increased pressure, and/or variations in driving speed while maintaining driver authority. Examples disclosed herein receive sensor data from sensors of a vehicle, generate a torque demand based on the input of the filter coefficients into a polynomial filter and tune a torque assistance or a steering damping of an assisted steering system of the vehicle based on the torque demand. By generating a torque demand based on the input of the filter coefficients into a polynomial filter, noise, vibration, and harshness in the steering system may be reduced by ensuring the system is properly damped.

Examples disclosed herein also ensure robust control in all conditions and resistance/rejection of sudden disturbances to the steering systems. Examples disclosed herein provide means to ensure the poles of the hydraulic steering assist control loop are well damped using a polynomial filter. In some examples disclosed herein, the loop shaping techniques enabled by the polynomial filter also assist in preventing system resonance, increasing robust control of the system and, more generally, maintaining system stability.

FIG. 1 is an illustration of an example steering system 100 within which the teachings of this disclosure may be implemented. In the illustrated example, the steering system 100 is a hybrid hydraulic power steering system (HPAS). In some alternative examples, the steering system 100 may be another type of power steering system (e.g., electro-hydraulic power steering (EHPS) system). The steering system 100 of the illustrated example includes a steering wheel 105 used to transmit driver inputs to the steering system 100 (e.g., rotating the steering wheel 105). In the illustrated example, the steering wheel 105 is coupled to a steering column 110. The example steering column 110 of the illustrated example includes an upper shaft 112, an upper intermediate shaft 114, a lower intermediate shaft 116, and an input shaft 118. In the illustrated example, the upper shaft 112 is coupled via a first universal joint 120 (e.g., a cardan-type universal joint) to the upper intermediate shaft 114. In the illustrated example, the upper intermediate shaft 114 is additionally coupled via a second universal joint 122 (e.g., a cardan-type universal joint) to the lower intermediate shaft 116. In the illustrated example, the lower intermediate shaft 116 is coupled to the input shaft 118 via a third universal joint 124 (e.g., a cardan-type universal joint). In some other examples, the first universal joint 120, the second universal joint 122, and the third universal joint 124 may be any other coupling means that allow rotary motion. In the illustrated example, a torque overlay unit 125 is coupled to the lower intermediate shaft 116. In some examples, the example torque overlay unit 125 may be directly coupled to the lower intermediate shaft 116 (e.g., via intermediate bracketry).

In the illustrated example, the example illustrated torque overlay unit 125 includes an example electric motor 135 and an example drive mechanism 130. The example torque overlay unit 125 provides means to tune the driver's input torque via the drive mechanism 130. In some examples, the torque overlay unit 125 may include an internal dedicated electronic control unit (e.g., the ECU 215 of FIG. 2). In some examples, the amount of tuning applied by the torque overlay unit 125 is controlled by the electronic control unit (e.g., the ECU 215 of FIG. 2). In some examples, the torque overlay unit 125 may include a torque sensor (e.g., the torque sensor 302 of FIG. 3) used to measure steering torque applied to the steering column. In some examples, the torque overlay unit 125 may include a housing for the electric motor 135, the torque sensor, drive mechanism 130 and/or an electronic control unit. The example drive mechanism 130 mechanically transfers the torque generated by the electric motor 135 to the lower intermediate shaft 116. Alternatively, the drive mechanism may be coupled to any suitable part of the steering system 100. In some examples, the drive mechanism 130 is a belt and pulley system. Alternatively, the drive mechanism 130 may be any suitable means for transferring the generated torque (e.g., a shaft, gears, etc.). In some examples, the torque overlay unit 125 may receive sensor data and/or other inputs to determine a modification or modifications to the torque applied by the electric motor 135. Alternatively, the torque overlay unit 125 may be any electromechanical means of tuning the electric steering assistance applied to the steering system 100.

In the illustrated example, the input shaft 118 is an input shaft of steering gear 150. In some examples, the steering gear 150 includes an output shaft. In some further examples, a pitman arm is coupled to the output shaft of the steering gear 150. In such further examples, the steering gear 150 may be coupled to steering linkages and tires of a vehicle via the pitman arm. In some examples, the steering gear 150 may include a rotary control valve or a spool valve and/or a power cylinder to direct a flow of hydraulic fluid. In some examples, the steering gear 150 transforms the rotational motion of the example input shaft 118 into a lateral force (e.g. by use of a rack and pinion, recirculating ball gear, etc.). In some examples, the hydraulic fluid directed by the steering gear 150 may be used to exert an assisting force on the steering linkages of the vehicle (e.g., by use of a piston cylinder). The lateral force may turn a wheel or wheels of a vehicle, thus turning the vehicle in a desired direction.

Figure 2:
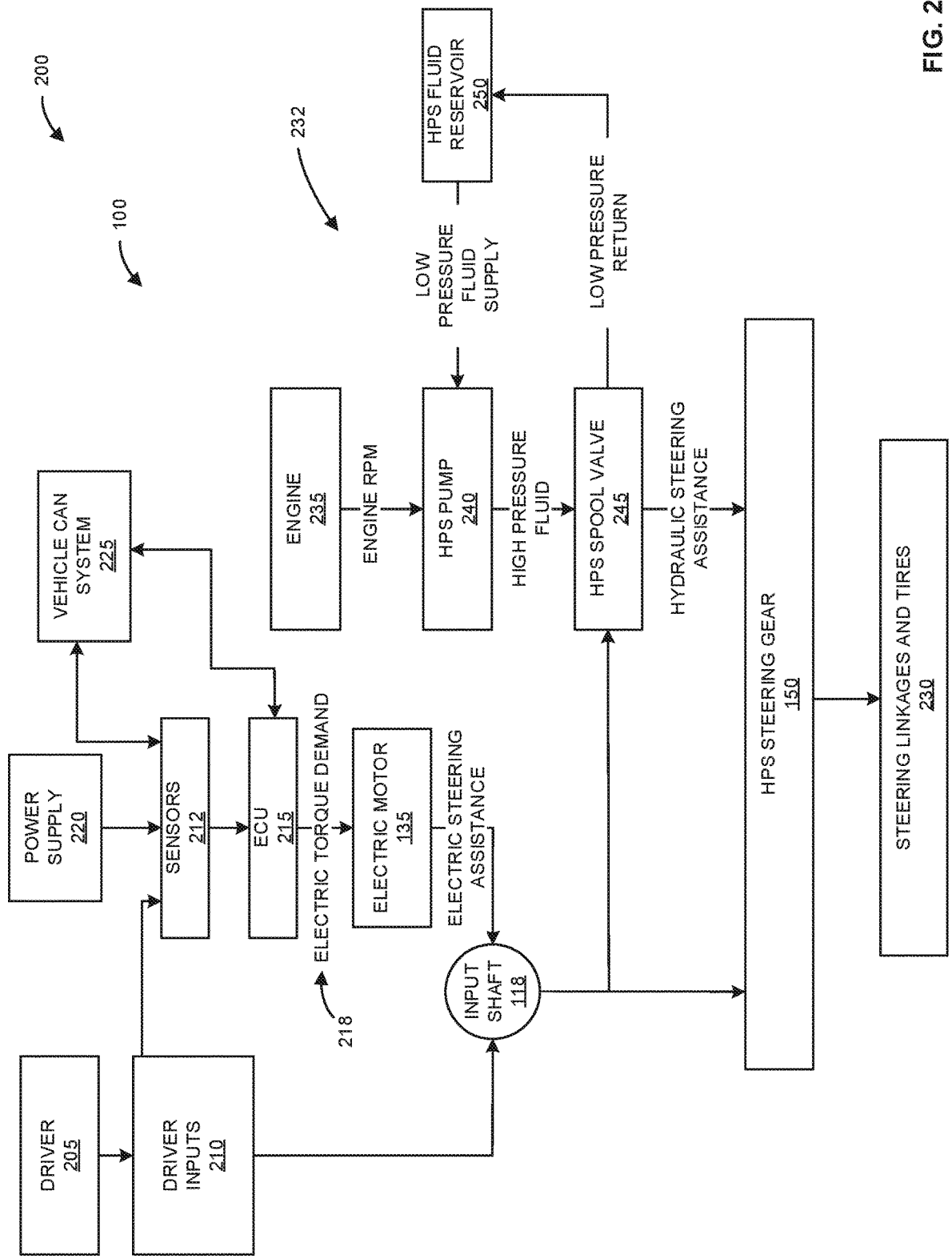
FIG. 2 is a block diagram representative of the example steering system of FIG. 1.

FIG. 2 is block diagram 200 representative of the example steering system 100 in which the methods disclosed herein may be implemented. The example steering system 100 receives, from a driver 205, driver inputs 210. In some examples, the driver inputs 210 may include modifications to an angle of the steering wheel, a steering torque and/or any other measurable input (e.g., throttle position, brake position, etc.). The driver inputs 210 may be measured by sensors 212 (e.g., the sensors 302-316 of FIG. 3). In some examples, the driver inputs 210 directly act upon the input shaft 118.

In the illustrated example, the sensors 212 output sensors data to an electronic control unit (ECU) 215. In some examples, the ECU 215 may be included in the example torque overlay unit 125 of FIG. 1. In the illustrated example, the sensors 212 and the ECU 215 are powered by an example power supply 220. In the illustrated example, the ECU 215 is additionally connected to an example vehicle Controller Area Network (CAN) system 225. In some examples, the vehicle CAN system 225 allows the ECU 215 and other devices (e.g. the sensors 212, an engine control unit, etc.) to communicate without a host computer. In other examples, the ECU 215 communicates directly with the sensors 212. Alternatively, the ECU 215 and the sensors 212 may communicate by any suitable means.

In the illustrated example, the ECU 215 receives the data from the sensors 212 and outputs an electric torque demand 218. Additional detail relating to how the electric torque demand 218 is calculated is provided below in conjunction with FIG. 3. In the illustrated example, the electric torque demand 218 is received by the electric motor 135, which applies a torque (e.g., the electric steering assist) to the example input shaft 118 of FIG. 1 based on the electric torque demand 218. In some examples, the electric motor 135 is directly coupled to a drive mechanism, such as the example drive mechanism 130 of FIG. 1. In such examples, the drive mechanism may be directly coupled (e.g. via brackets) to a steering column, such as the example steering column 110 of FIG. 1. The electric steering assistance applied by the electric motor 135 of the illustrated example may therefore be transferred to the input shaft 118 through the example drive mechanism 130 of FIG. 1. In the illustrated example, the driver input 210 is also directly applied to the input shaft 118.

In the illustrated example, the input shaft 118 applies an input shaft torque to the example HPS steering gear 150 of FIG. 1. In some examples, the input shaft torque is a combination (e.g., a summation) of the driver inputs 210 and the electric steering assist of the electric motor 135. In the illustrated example, the steering gear 150 is coupled to steering linkages and tires 230. In some examples, the steering gear 150 may include an output shaft. In some examples, a pitman arm may be coupled to the output shaft of the steering gear 150 and may connect the steering gear 150 to the steering linkages and tires 230. In such examples, the steering gear 150 may transform a rotational motion of the example input shaft 118 into a lateral force (e.g. by use of a rack and pinion, recirculating ball gear, etc.). The lateral force may be applied to the steering linkages and tires 230 to turn a wheel or wheels of the vehicle.

In the illustrated example, the example steering system 100 also includes an example hydraulic power steering system 232. In the illustrated example, the hydraulic power steering (HPS) system 232 includes an example engine 235, an example HPS pump 240, an example HPS spool valve 245, and an example HPS fluid reservoir 250. In the illustrated example, the engine 235 drives the HPS pump 240. In some examples, the engine 235 is the internal combustion engine of the vehicle. Alternatively, the engine 235 may be any suitable means for driving the HPS pump 240 (e.g., a battery powered electric motor). In some examples, the engine 235 is operatively coupled to the HPS pump 240 via a belt and pulley system. In some examples, the HPS pump 240 is a rotary-vane pump. In the illustrated example, the HPS pump 240 is also connected to the HPS spool valve 245. In the illustrated example, the HPS pump 240 is connected to the HPS fluid reservoir 250. In some examples, the HPS pump 240 is connected to the HPS fluid reservoir 250 via a return line.

In the illustrated example, the HPS pump 240 pumps high-pressure fluid (e.g., hydraulic fluid such as a mineral oil or silicone-based fluid) to the HPS spool valve 245. In some examples, the pressure of the high-pressure fluid is measured by a pressure sensor (e.g., the sensor 310 of FIG. 3). In the illustrated example, the HPS spool valve 245 returns low-pressure fluid to the HPS fluid reservoir 250. In the illustrated example, the HPS fluid reservoir 250 supplies the HPS pump 240 with low-pressure fluid. The low-pressure fluid supply may then be used by the HPS pump 240.

In the illustrated example, the input shaft 118 applies the input shaft torque to the HPS spool valve 245. The input shaft torque may turn the example HPS spool valve 245, opening fluid channels for the high-pressure fluid to flow through. In some examples, the high-pressure fluid is directed to a piston within a cylinder (e.g., a double-acting piston cylinder) by the HPS spool valve 245 (e.g., by opening fluid channels). In such examples, the HPS spool valve 245 directs the high-pressure fluid to one side of the piston based on a direction in which the steering wheel 105 is turned (e.g., to the left or to the right). The high-pressure fluid exerts a force on the piston, thereby applying a hydraulic steering assist to the steering gear 150. In some examples, the HPS spool valve 245 directs more high-pressure fluid when the steering wheel 105 is turned further (e.g., by further opening the fluid channels), thereby increasing the hydraulic steering assist. Alternatively, the hydraulic steering assist decreases when the steering wheel 105 is turned back toward its original position. In the illustrated example, the steering gear 150 then applies a total steering assist to the steering linkages and tires 230 based on the hydraulic steering assist from the HPS system 232 and/or the input shaft torque, thus turning the wheels of the vehicle. In some examples, the total steering force includes the driver input 210, the electric steering assist, and the hydraulic steering assist.

Figure 3:
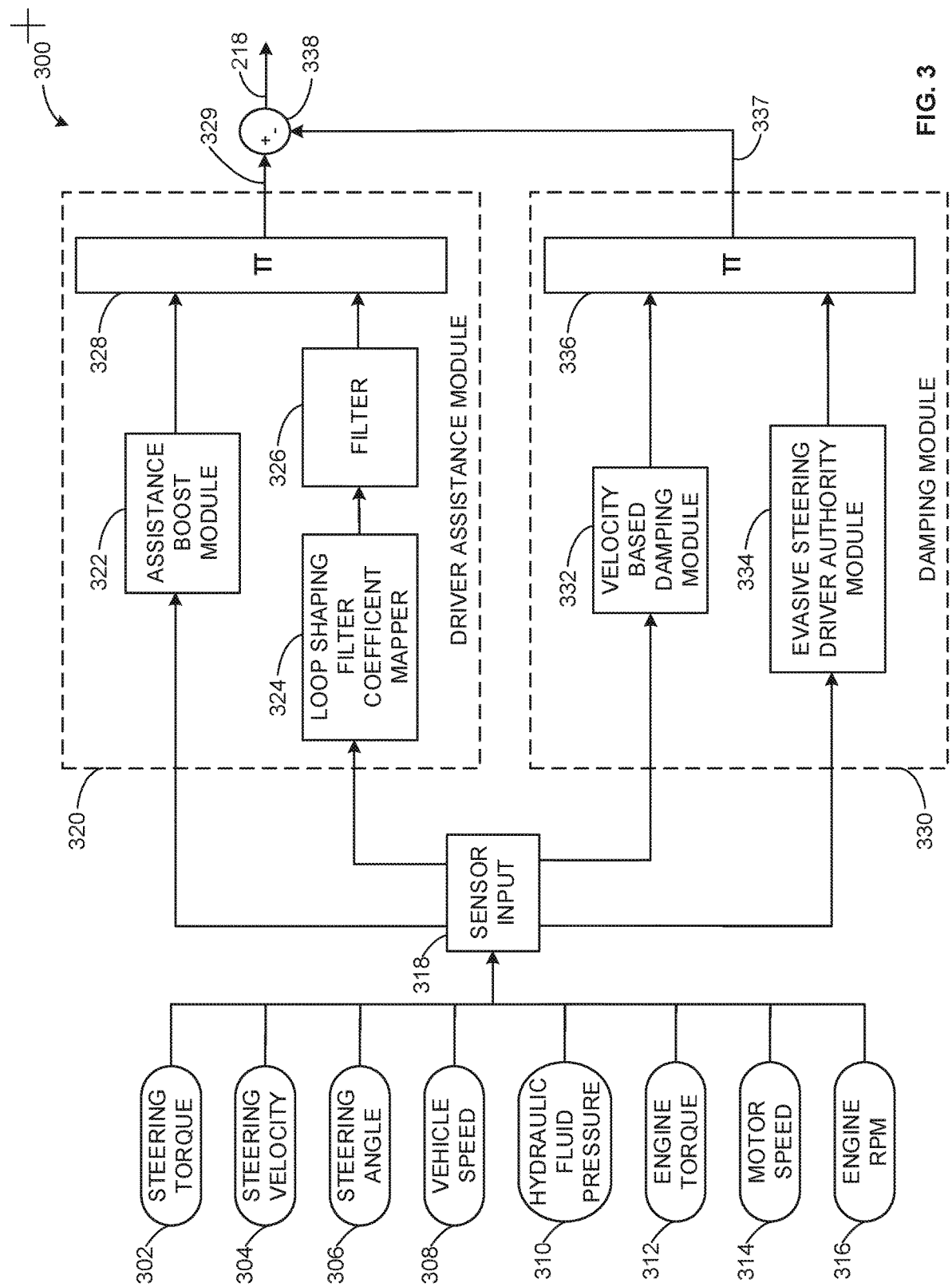
FIG. 3 is a process control diagram for the steering system of FIG. 1 in which the disclosed methods to reduce noise, vibration and harshness may be implemented.

FIG. 3 is a process control diagram for the torque overlay unit 125 in which the disclosed methods to reduce noise, vibration and harshness may be implemented. In some examples, the torque overlay unit 125 may be controlled and/or implemented by an electronic control unit (ECU), such as the example ECU 215 of FIG. 2. In the illustrated example, the sensor input 318 receives data from one or more of an example steering torque sensor 302, an example steering velocity sensor 304, an example steering angle sensor 306, an example vehicle speed sensor 308, an example hydraulic fluid pressure sensor 310, an example engine torque sensor 312, an example motor speed sensor 314 and an example engine rpm sensor 316. A sensor input 318 then directs the relevant sensor values to an example driver assistance module 320 and an example damping module 330. The example driver assistance module 320 includes an example assistance boost module 322, an example loop shaping filter coefficient mapper 324, an example filter 326 and an example first product block 328. The example damping module 330 includes an example velocity based damping module 332, an example evasive steering driver authority module 334, and an example second product block 336. The example output of the driver assistance module 320 (e.g., a driver assistance value 329) and the damping module 330 (e.g., a damping value 337) are input to a combination block 338.

The example steering torque sensor 302 measures the steering torque applied to the steering column (e.g., the steering column 110 of FIG. 1). In some examples, the steering torque sensor 302 is coupled to the input shaft 118 of FIG. 1 and measures the torque exert by the driver on the steering system 100. In other examples, the steering torque sensor 302 is coupled to an intermediate shaft of a steering system, such as the example lower intermediate shaft 116 of FIG. 1. In some examples the steering torque sensor 302 is any suitable means of measuring engine torque (e.g., a magnetoelastic torque sensor, a rotary strain gauge, etc.). Additionally or alternatively, the steering torque may be derived from any other suitable measurable quantities.

The example steering velocity sensor 304 measures the velocity of the steering wheel. In some examples, the steering velocity sensor 304 is coupled to the upper shaft 112 of FIG. 1 or the steering wheel 105 of FIG. 1. In some examples, the steering velocity sensor 304 may be any suitable means for measuring the rotational speed of the steering wheel 105 (e.g., a tachometer, a reflective sensor, an interrupted sensor, an optical encoder, a variable reluctance sensor, a Hall-effect sensor, etc.). Additionally or alternatively, the steering velocity may be derived from the steering angle or any other suitable measurable quantities.

The example steering angle sensor 306 measures the angle of the steering wheel. In some examples, the steering angle sensor 306 is coupled to the upper shaft 112 of FIG. 1 or the steering wheel 105 of FIG. 1. In some examples, the steering angle sensor 306 may be any suitable means for measuring the angle of the steering wheel 105 (e.g., a rotary encoder, an optical encoder, a Hall-effect sensor, a resolver, a magnetic sensor, etc.). Additionally or alternatively, the steering angle may be derived from the steering velocity or any other suitable measurable quantities.

The example vehicle speed sensor 308 measures the speed of the vehicle. In some examples, the vehicle speed sensor 308 may be coupled to the steering linkages and tires 230. In some examples, the vehicle speed sensor may be any suitable means for measuring the speed of the vehicle (e.g., a wheel speed sensor, a tachometer, a reflective sensor, an interrupted sensor, an optical encoder, a variable reluctance sensor, a Hall-effect sensor, etc.). Additionally or alternatively, the vehicle speed may be derived from any suitable measurable quantities.

The example hydraulic fluid pressure sensor 310 measures the pressure of the fluid in the hydraulic system 232. In the illustrated example, the hydraulic fluid pressure measured is the high pressure line (e.g., the line between HPS Pump 240 and HPS Spool Valve 245 of FIG. 2). In other examples, the hydraulic fluid pressure may be measured in the low pressure return line (e.g., the line between HPS spool valve 245 and HPS Fluid Reservoir 250 in FIG. 2). The hydraulic fluid pressure sensor 310 may be any suitable means for measuring the fluid pressure (e.g., a piezoresistive sensor, a pitot tube, a diaphragm gauge, a piston gauge, a Bourdon tube, a bellows gauge, a capacitive sensor, etc.). Additionally or alternatively, the hydraulic fluid pressure may be derived from any suitable measurable quantities. For example, the hydraulic fluid pressure could be derived from data gathered from the engine RPM sensor 316, the steering velocity sensor 304 and the steering torque sensor 302.

The engine torque sensor 312 measures the torque of the engine of the vehicle (e.g., the engine 235 of FIG. 2). In some examples the engine torque sensor 312 is any suitable means of measuring engine torque (e.g., a magnetoelastic torque sensor, a rotary strain gauge, etc.). Additionally or alternatively, the engine torque may be derived from any suitable measurable quantities.

The motor speed sensor 314 measures the speed of the electric motor used to apply the electric steering assist (e.g., the electric motor 135 of FIG. 1). In some examples, the motor speed sensor 314 may be any suitable means for measuring the speed of the electric motor 135 (e.g., a tachometer, a reflective sensor, an interrupted sensor, an optical encoder, a variable reluctance sensor, a Hall-effect sensor, etc.). Additionally or alternatively, the motor speed may be derived from any suitable measurable quantities.

The engine rpm sensor 316 measures the rpm of the engine (e.g., the engine 235 of FIG. 2). In some examples the engine RPM sensor 316 is any suitable means of measuring engine speed (e.g., a tachometer, a reflective sensor, an interrupted sensor, an optical encoder, a variable reluctance sensor, a Hall-effect sensor, etc.). Additionally or alternatively, the engine RPM may be derived from any suitable measurable quantities.

The example driver assistance module 320 determines a torque boost to be applied to the example input shaft 118. In the illustrated example, the driver assistance module 320 generates the driver assistance value 329 based on the input from the sensor input 318. In some examples, the driver assistance value 329 is representative of the electric torque demand 218 calculated by the ECU 215. The example driver assistance module 320 includes an example assistance boost module 322. In some examples, the sensor input 318 directs the relevant sensor values (e.g., steering torque, steering angle, etc.) into the assistance boost module 322. In some examples, the assistance boost module 322 is a linear look-up table with greater steering torque input values (e.g., measured by the steering torque sensor 302) causing higher torque assistance boost outputs. Alternatively, the assistance boost module 322 may be implemented by any suitable means.

The example loop shaping filter coefficient mapper 324 maps the sensor values inputted by the sensor 318 into filter coefficients for the example filter 326. In some examples, the example filter 326 is a digital polynomial filter. For example, the filter 326 may be a quadratic (second order) filter. Alternatively, the filter 326 may be of any suitable order (e.g., linear filter, third order filter, etc.) with an appropriate corresponding transfer function. In the illustrated example, the digital filter 326 is a quadratic filter with a transfer function that can be expressed as:

$$H_{Filter}(s) = \frac{num(s)}{den(s)} = \frac{as^2 + bs + c}{ds^2 + es + f} \quad (1)$$

Where H(s) is the transfer function of the filter 326, num(s) is the numerator of the transfer function, den(s) is the denominator of the transfer function (e.g., the characteristic polynomial of the filter 326) and a, b, c, d, e and f are the coefficients of the filter 326. The loop shaping filter coefficient mapper 324 maps the measured quantities from the sensor input 318 into values for the coefficients of the filter 326. In some examples, any or each coefficient (e.g., a, b, c, d, e and f) to be mapped by loop shaping filter coefficient mapper 324 may be determined by a lookup table or graph. In some examples, the look-up tables associated with the loop shaping filter coefficient mapper 324 are generated based on the make and model of the vehicle and programmed during the assembly. Alternatively, the look-up tables associated with the loop shaping filter coefficient mapper 324 may be calibrated for each individual vehicle during quality testing after manufacturing.

In the illustrated example, the first product block 328 multiples the outputs of the filter 326 and the assistance boost module 322 together to generate driver assistance value 329. In other examples, the first product block 328 sums the outputs of the filter 326 and the assistance boost module 322 or uses any other mathematical function to combine the outputs of the filter 326 and the assistance boost module 322 (e.g., convolution). In some examples without a velocity damping function, the output of the first product block 328 acts as the output of the assistance boost module. An example of overall transfer function for the driver assistance module 320 can be given as:

$$H_{DA}(s) = H_{Filter}(s) + H_{Boost}(s) = \frac{as^2 + bs + c}{ds^2 + es + f} + H_{Boost}(s) \quad (2)$$

Where $H_{DA}(S)$ is the overall transfer function and $H_{Boost}(s)$ is the transfer function of the assistance boost module 322. By changing the coefficients of the filter 326, the shape of the overall transfer function (e.g., the control loop) can be changed. For example, changing coefficients of the filter 326 enables the placement of real and imaginary poles in the overall transfer function (e.g., changing the coefficients of the digital filter 326 changes the values where $H_{DA}(S)$ is undefined and/or zero). In some examples, when the output of the driver assistance module 320 nears a pole, the system becomes unstable which can lead to noise, vibration, and harshness in the steering column as well as driver discomfort. Thus, in some examples, by adjusting coefficients of the digital filter 326 with the loop shaping filter coefficient mapper 324, the poles of the driver assistance module 320 can be avoided.

In some examples, where the steering system 100 has a mechanical or electrical resonance frequency, adjusting the shape of the overall transfer function allows this resonance frequency to be dynamically avoided regardless of driving conditions and driver inputs. Additionally, in some examples, the use of the digital filter 326 allows unexpected disturbances (e.g., hitting a pothole, avoiding a hazard in the road) to be rejected by the system. Additionally, in some examples, by dynamically changing the coefficients of the digital filter 326, robust (e.g., ability to achieve high gains while minimizing stability loss) control can be maintained.

The example damping module 330 determines how much the electric steering assistance should be reduced due to driving conditions. The damping module 330 includes the example velocity based damping module 332 and the example evasive steering driver authority module 334. In the illustrated example, the damping module 330 uses the input data from the sensor input 318 to generate a damping value 337. In some examples, the damping value 337 is representative of the magnitude of the electric torque demand 218 calculated by the ECU 215. For example, the example velocity based damping module 332 receives an input (e.g., the velocity of steering wheel) from the sensor input 318 and calculates a damping command. In some examples, the magnitude of damping command is determined via a look-up tables. In this example, the velocity based damping module 332 correlates, using a look-up table, the velocity of the steering wheel 105 to a magnitude of the damping command.

The example evasive steering driver authority module 334 determines the amount to reduce the velocity based damping based on driving conditions. For example, if, based on the input from the sensor input 318, the evasive steering driver authority module 334 determines the driver is making parking maneuvers (e.g., the rate of change of the steering velocity is low), the velocity based damping is allowed to function without further adjustment. Alternatively, if, based on the input from the sensor input 318, the evasive steering driver authority module 334 determines the driver is making a high speed evasive maneuver (e.g., the rate of change of the steering velocity is high), velocity based damping is reduced or eliminated. In some examples, the evasive steering driver authority module 334 provides an output reflective of the modification to be made to the velocity based damping.

In the illustrated example, the outputs from the evasive steering driver authority module 334 and the velocity based damping module 332 are combined in the second product block 336. In some examples, the product block multiples the outputs together. In other examples, the product block may alternatively sum or use any other suitable means of combining the outputs. In some examples, this allows the evasive steering driver authority module 334 to reduce the output of the velocity based damping module 332.

In the illustrated example, the combination block 338 may combine the outputs from the driver assistance module 320 (e.g., the driver assistance value 329) and the damping module 330 (e.g., the damping value 337). In the illustrated example, the electric torque demand 218 of FIG. 2 is computed by subtracting the damping value 337 from the driver assistance value 329. Alternatively, the damping value s 337 and driver assistance value 329 may be combined in any other suitable manner (e.g., addition, multiplication, etc.). In some examples, the outputs from the driver assistance module 320 or the damping module 330 may be equal to zero. The combination block 338 outputs the electric torque demand 218, which is representative of the torque demand from the electric steering system. In the illustrated example, the electric torque demand 218 is the only value output by the example combination block 338. In some examples, the electric motor 135 generates an electric steering assistance based on the magnitude of the electric torque demand 218. In some examples, the electric torque demand 218 may have a positive value. In such examples, the electric motor 135 increases the input torque applied to the input shaft 118 by the driver 205. Alternatively, if the electric torque demand 218 is negative, the electric motor 135 reduces the amount of torque applied by the driver 205 to the input shaft 118.

Figure 4:
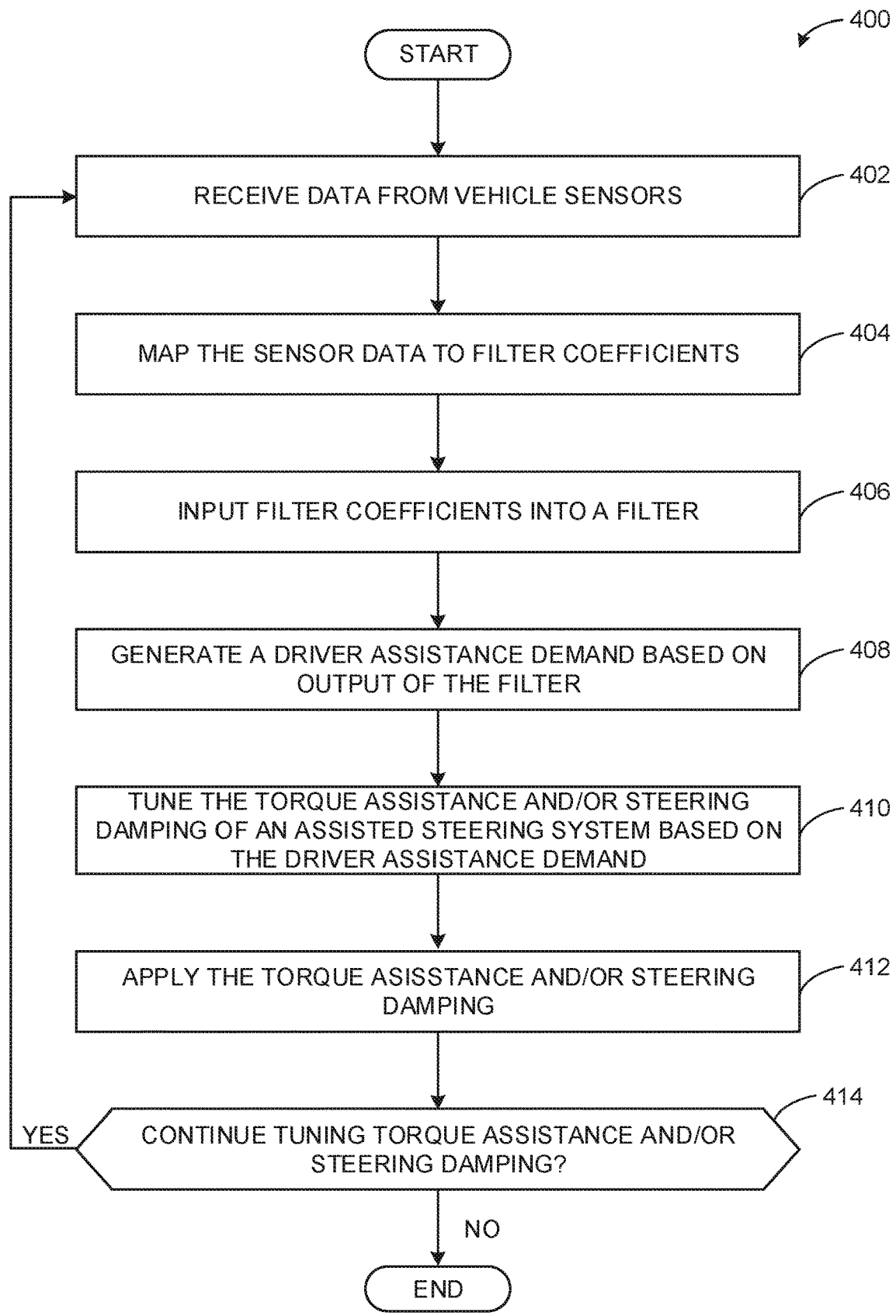
FIG. 4 is a flow diagram of an example method to modify the torque assist loop using loop shaping techniques via a digital filter.
Figure 5:
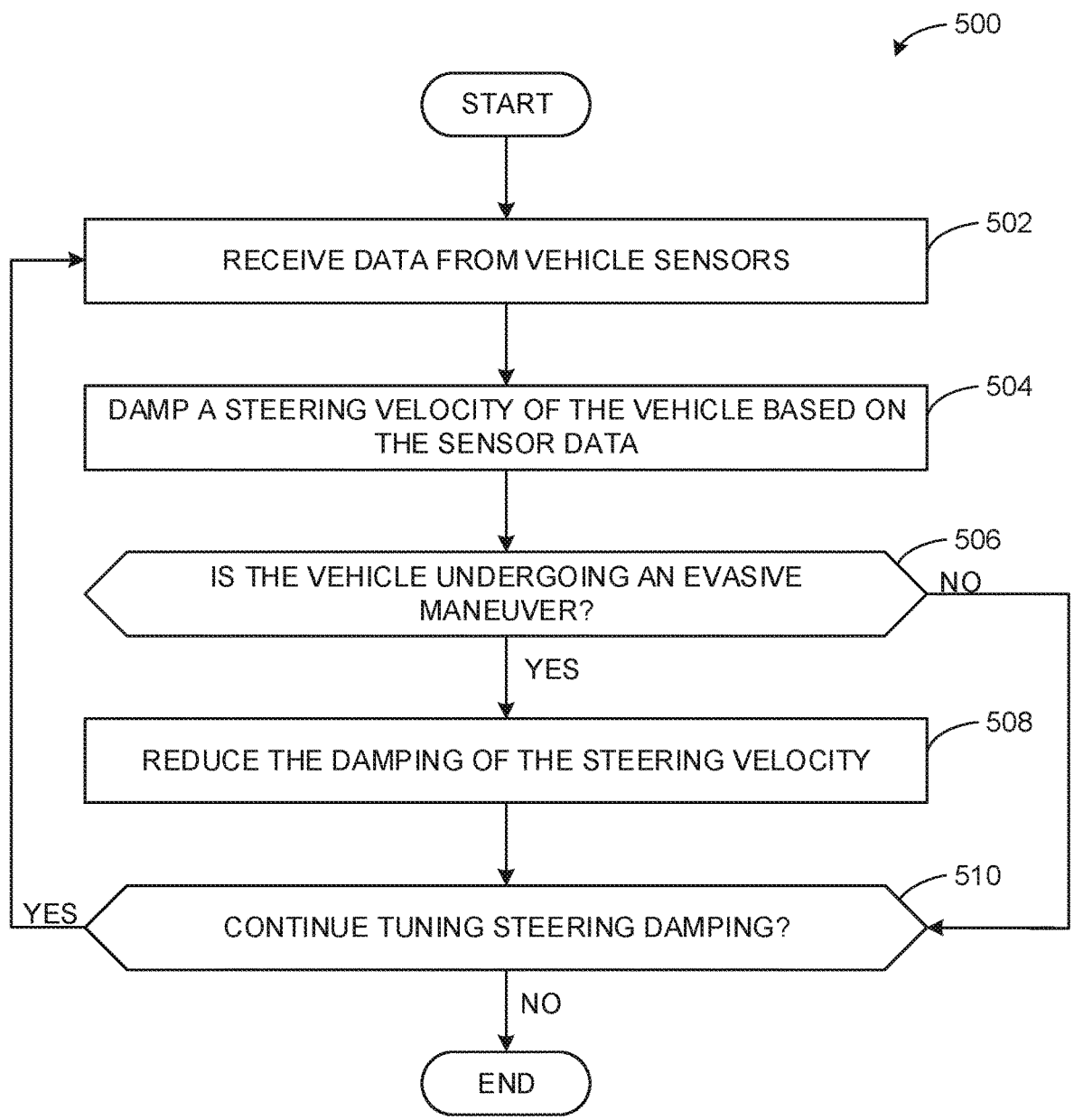
FIG. 5 is a flow diagram of example method to modify the hydraulic assist to ensure driver authority during evasive maneuvers.

Flowcharts representative of example methods for implementing the ECU 215 of FIG. 2 and control system 300 of FIG. 3 are shown in FIGS. 4-5. The methods may be implemented using machine readable instructions. The machine readable instructions may be a program or portion of a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although example programs are described with reference to the flowcharts illustrated in FIGS. 4 and 5, many other methods of implementing the example ECU 215 of FIG. 2 and control system 300 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example methods of FIGS. 4 and 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The method 400 of FIG. 4 begins at block 402. At block 402, the sensor input 318 receives sensor data from the sensors of a vehicle. For example, the example sensor input 318 may receive sensor data from any combination of the example sensors 302-316. Additionally or alternatively, the sensor input 318 may calculate any required sensor data value(s) from other sensor data collected from any combination of the example sensors 302-318. For example, the sensor input 318 may calculate the hydraulic fluid pressure data based on the engine RPM data, the steering velocity data and the steering torque data. For example, the steering angle (e.g., the data collected from the steering angle sensor 306) and steering velocity (e.g., the data collected from the steering velocity sensor 304) may be derived from one another. After all sensor data is received and/or calculated, the method 400 advances to block 404.

At block 404, the loop shaping filter coefficient mapper 324 maps the sensor data to filter coefficients for the example digital filter 326. For example, using the sensor data received and/or calculated by the sensor input 318, the loop shaping filter coefficient mapper 324 maps the sensor data to a pre-set look-up table to determine the coefficients of a transfer function for the example digital filter 326. In this example, the values contained in the pre-set look-up table are associated with the make and model of the vehicle (e.g., the look-up table for a Ford F150 is distinct and separate from the look-up table for a Ford Focus) and programmed during vehicle assembly. Additionally or alternatively, the look-up tables associated with the loop shaping filter coefficient mapper 324 may be calibrated for each vehicle during quality testing to ensure an optimal performance to reduce noise, vibration and harshness in the operation of the steering system 100. In other examples, the loop shaping filter coefficient mapper 324 may calculate the coefficient values for the digital filter 326 using an equation that uses sensor data values as independent variables. In other examples, the loop shaping filter coefficient mapper 324 may map the sensor data values directly onto a curve to generate coefficient values. Once the digital filter coefficients have been generated, the method 400 advances to block 406.

At block 406, the filter coefficients are input into the digital filter 326. For example, the filter coefficients are used to change the transfer function of the digital filter 326. In some examples, by changing the transfer function, the digital filter changes the corresponding output from the input sensor data values. In some examples, the digital filter 326 is designed to increase system stability, shape the overall transfer function of the driver assistance module 320 to keep the output away from system poles and zeros, and thus, ensure robust steering control in the current state of the steering system and driving conditions. After the output of the digital filter 326 is generated, the method 400 advances to block 408.

At block 408, the first product block 328 generates a driver assistance value 329 based on the output of the filter 326. For example, the first product block 328 combines the output of the digital filter 326 and the assistance boost module 322 by multiplying the outputs together. Alternatively, the outputs of the digital filter 326 and the assistance boost module 322 may be combined in any suitable manner (e.g., addition, arithmetic mean, etc.). In other examples where the assistance boost module 322 is absent, the driver assistance value 329 is generated using only the output of the digital filter 326. Once the driver assistance value 329 is generated, the method 400 advances to block 410.

At block 410, the combination block 338 tunes the torque assistance and/or steering damping of the assisted steering system 100 based on the driver assistance value 329. For example, the combination block 338 combines the outputs of the driver assistance module 320 (e.g., the driver assistance value 329) and damping module 330 to generate the overall electric torque demand 218. In the example illustrated in FIG. 3, the output of the damping module 330 is subtracted from the driver assistance module 320 to calculate the electric torque demand 218. Alternatively, any suitable means may be used to combine the outputs of the driver assistance module 320 and the damping module 330 (e.g., addition, division, arithmetic mean, etc.). In other examples where the damping module 330 is absent, the electric torque demand 218 is equal to the driver assistance value 329. The method 400 then advances to block 412.

At block 412, the electric motor 135 applies the torque assistance and/or steering damping. For example, in the illustrated example of FIG. 2, the electric torque demand 218 is sent from the ECU 215 to the electric motor 135. In this example, the electric motor 135 appends the driver input 210 to the assisted steering system 100 based on the electric torque demand 218 by applying torque to the input shaft 118. In some examples, the torque generated by the electric motor 135 is applied to the input shaft 118 by the drive mechanism 130. In some examples, by applying the electric steering assistance, the electric motor optimizes the steering system 100 to avoid outputs that cause noise, vibration or harshness in the steering system 100. The process then advances to block 414.

At block 414, process control determines if the method 400 will continue tuning torque assistance and/or steering damping. If the torque assistance is to be retuned, the method 400 returns to block 402 and repeats. If the torque assistance is not to be retuned, the method 400 ends. For example, the method 400 may continue as long as the vehicle is in operation. Alternatively, the method 400 may only occur in particular driving conditions (e.g., only activated during low speed maneuvering, etc.). In some examples, the method 400 is repeated continuously at a predetermined frequency to ensure the control loop of the driver assistance module 320 is well damped and shaped to minimize noise, vibration and harshness in the assisted steering system 100 (e.g., avoiding the poles of the transfer function of the system). Alternatively, the method 400 may be triggered based on a change in driving conditions detected by one or more of the sensors 302-316. In some examples, the changes caused in the assisted steering system 100 by method 400 are detected by the sensors 302-316, which creates a closed feedback loop.

The method 500 of FIG. 5 begins at block 502. At block 502, the sensor input 318 receives sensor data from the sensors of the vehicle. For example, the example sensor input 318 may receive sensor data from any combination of the example sensors 302-316. Additionally or alternatively, the sensor input 318 may calculate any required sensor data value from other sensor data collected from any combination of the example sensors 302-318. For example, the sensor input 318 may calculate the hydraulic fluid pressure data based on the engine RPM data, the steering velocity data and the steering torque data. For example, the steering angle (e.g., the data collected from the steering angle sensor 306) and steering velocity (e.g., the data collected from the steering velocity sensor 304) may be derived from one another. After all sensor data is received and/or calculated, the method 500 advances to block 504.

At block 504, the velocity based damping module 332 damps a steering velocity of the vehicle based on the sensor data. For example, using the sensor data input by the sensor input 318 data, the velocity based damping module 332 calculates a damping output which is input to combination block 338 to be combined with the output of the driver assistance module 320. In this example, the calculated velocity damping output generates an electric steering assistance demand opposed to the driver input 210 whereas the driver assistance module 320 generates a demand increasing the driver input 210. In other examples where the driver assistance module is absent, the velocity damping causes the electric motor 135 to reduce the amount of torque applied by the driver input 210. The method 500 then advances to block 506.

At block 506, the example evasive steering driver authority module 334 determines if the vehicle is undergoing an evasive maneuver. If the vehicle is undergoing an evasive maneuver, the method 500 advances to block 508. If the vehicle is not undergoing an evasive maneuver, the method 500 advances to block 510. For example, the example evasive steering driver authority module 334 determines if the vehicle is undergoing an evasive maneuver by comparing a rate of change (e.g., the derivative, etc.) of the steering velocity (e.g., the steering acceleration) to a threshold. In some examples, a high rate of change in the steering velocity indicates the driver is making a high speed maneuver (e.g., avoiding a hazard in the road, making a high speed lane change, etc.). In some examples, the threshold is determined based on the make and model of vehicle. Alternatively, the threshold may be dynamically calculated based on vehicle and driving conditions, calibrated by the driver or by any other suitable means. In some examples, the threshold is associated with the driver making a high speed maneuver. In some examples, if the vehicle is undergoing an evasive maneuver, the evasive steering driver authority module 334 generates an output associated with the vehicle undergoing an evasive maneuver.

At block 508, the second product block 336 reduces the damping of the steering velocity. For example, the second product block 336 combines the output of the evasive steering driver authority module 334 and the velocity based damping module 332. In this example, the combination of the outputs from the velocity based damping module 332 and evasive steering driver authority module 334 reduces the magnitude of the damping command output by the 330. In some examples, reducing the magnitude damping command causes the electric steering assistance to be closer to zero which leads to greater driver authority. The method 500 then advances to block 510.

At block 510, process control determines if the method 500 will continue tuning the steering damping. If the steering damping is to be retuned, the method 500 returns to block 502 and repeats. If the steering damping is not to be retuned, the method 500 ends. For example, the method 500 may continue to repeat as long as the vehicle is in operation.

Alternatively, the method 500 may only occur in particular driving conditions (e.g., only activated above a particular engine RPM as detected by sensor 316). In some examples, the method 500 is repeated continuously at a predetermined frequency. Alternatively, the method 500 may be triggered based on a change in driving conditions detected by one or more of the sensors 302-316. In some examples, the changes caused in the assisted steering system 100 by method 500 are detected by the sensor 302-316, which creates a closed feedback loop.

Figure 6:
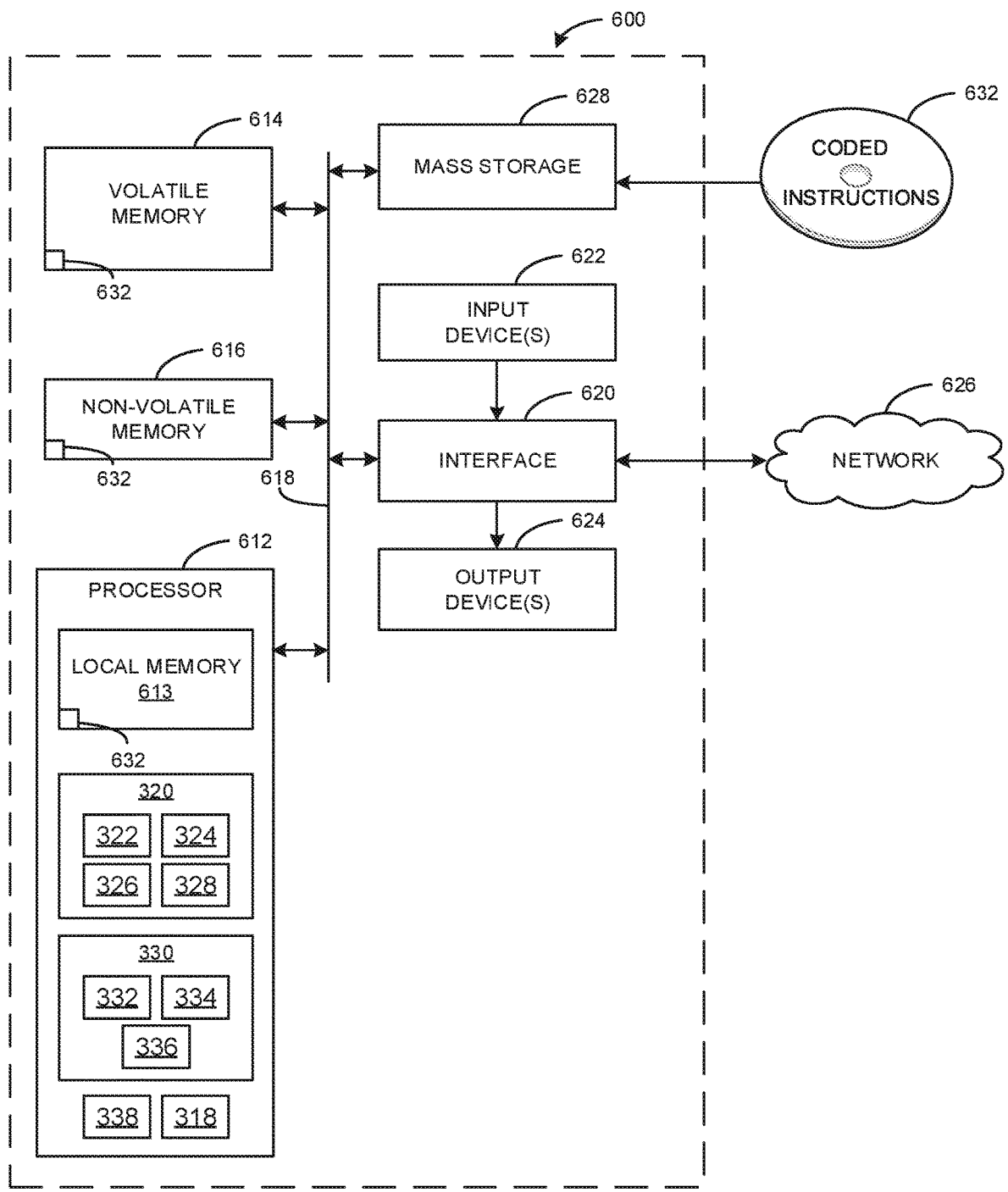
FIG. 6 is a block diagram of an example processor platform structured to execute instructions to implement the process control system of FIG. 3.

FIG. 6 is a block diagram of an example processor platform 6000 capable of executing instructions to implement the methods of FIGS. 4 and 5 to implement the control system 300 of FIG. 3. The processor platform 600 can be, for example, an embedded controller, a computer, a workstation, a self-learning machine (e.g., a neural network), a mobile device (e.g., a cell phone, a smart phone, a tablet such as an iPad™), or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 612 implements the example sensor input 318, the example assistance boost module 322, the example loop shaping filter coefficient mapper 324, the example digital filter 326, the first product block 328, the example damping module 330, the example velocity based damping module 332, the example evasive steering driver authority module 334, the example second product block 336 and the example combination block 338.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 620 of the illustrated example, thus, typically includes a graphics driver card, a graphics driver chip, and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 to implement the methods of FIGS. 4-5 may be stored in the mass storage device 628, in the volatile memory 614, in the non-volatile memory 1016, and/or on a removable non-transitory computer readable storage medium such as a CD or DVD.

From the foregoing, it will be appreciated that example methods and apparatus have been disclosed offer reduced noise, vibration and harshness in a hybrid hydraulic steering system by utilizing a digital filter. The disclosed methods and apparatus add effective damping to HPAS systems without added cost and increases in energy usage when compared to shaping spool valve edges or adding elements in the hydraulic system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
receiving sensor data from sensors of a vehicle;
mapping the sensor data to filter coefficients;
generating a torque demand based on a transfer function, the transfer function based on an input of the filter coefficients into a polynomial filter, the filter coefficients selected to avoid poles of the transfer function; and
tuning at least one of a torque assistance or a steering damping of an assisted steering system of the vehicle based on the torque demand.

2. The method of claim 1, wherein the assisted steering system is a hybrid hydraulic steering system.

3. The method of claim 1, wherein the sensor data includes one or more of steering velocity data, steering angle data, steering torque data, vehicle speed data, hydraulic fluid pressure data, engine torque data, motor speed data, or engine RPM data.

4. The method of claim 3, further including determining the hydraulic fluid pressure data based on the engine RPM data, the steering velocity data and the steering torque data.

5. The method of claim 1, wherein the filter coefficients are specific to a model of the vehicle.

6. The method of claim 1, further including applying the torque assistance via an electric actuator operatively coupled to a steering shaft of the vehicle.

7. The method of claim 1, wherein the polynomial filter is a second order filter.

8. The method of claim 1, wherein the tuning at least one of a torque assistance or a steering damping of an assisted steering system increases a stability of the assisted steering system.

9. A computer readable storage medium comprising instructions which, when executed, cause a processor to at least:
receive sensor data from sensors of a vehicle;
map the sensor data to filter coefficients, the filter coefficients specific to a model of the vehicle;
generate a torque demand based on an input of the filter coefficients into a polynomial filter; and
tune at least one of a torque assistance or a steering damping of an assisted steering system of the vehicle based on the torque demand.

10. The computer readable storage medium of claim 9, wherein the assisted steering system a hybrid hydraulic steering system.

11. The computer readable storage medium of claim 9, wherein the sensor data includes one or more of steering velocity data, steering angle data, steering torque data, vehicle speed data, hydraulic fluid pressure data, engine torque data, motor speed data, or engine RPM data.

12. The computer readable storage medium of claim 11, wherein the hydraulic fluid pressure data is determined based on the engine RPM data, the steering velocity data and the steering torque data.

13. The computer readable storage medium of claim 9, which, when executed, further cause a processor to at least:
apply the torque assistance via an electric actuator operatively coupled to a steering shaft of the vehicle; and
apply the steering damping via the electric actuator.

14. The computer readable storage medium of claim 9, wherein the polynomial filter is a second order filter.

15. A method comprising:
receiving sensor data from sensors of a vehicle;
damping a steering velocity of the vehicle based on the sensor data;
determining if the vehicle is undergoing an evasive maneuver by comparing a rate of change of the steering velocity to a threshold associated with the evasive maneuver; and
if the vehicle is undergoing an evasive maneuver, reducing the damping of the steering velocity.

16. The method of claim 15, wherein the sensor data includes one or more of steering velocity data, steering angle data, steering torque data, vehicle speed data, hydraulic fluid pressure data, engine torque data, motor speed data, or engine RPM data.

17. The method of claim 16, further comprising determining the hydraulic fluid pressure data based on the engine RPM data, the steering velocity data and the steering torque data.

18. The method of claim 15, wherein the vehicle has a hybrid steering system.

19. The method of claim 1, wherein the transfer function is further based on a linear look-up table, an output of the linear look-up table proportional to a value of the sensor data.

20. The method of claim 15, wherein the reducing of the damping of the steering velocity includes eliminating the damping of the steering velocity.

* * * * *